June 29, 1926.
N. O. JOHNSON ET AL
1,590,582
TRACTOR HITCH
Filed August 6, 1925 3 Sheets-Sheet 1
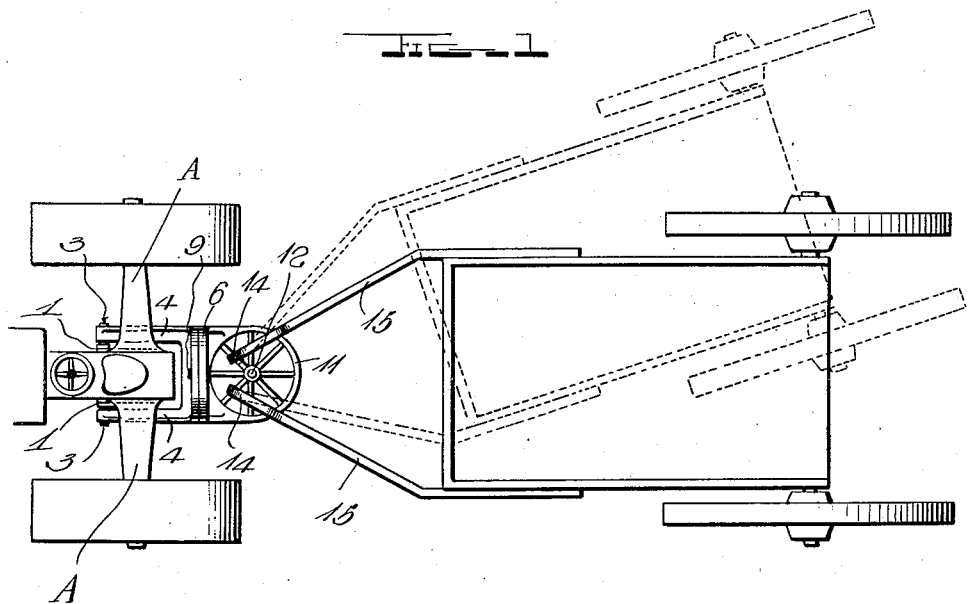
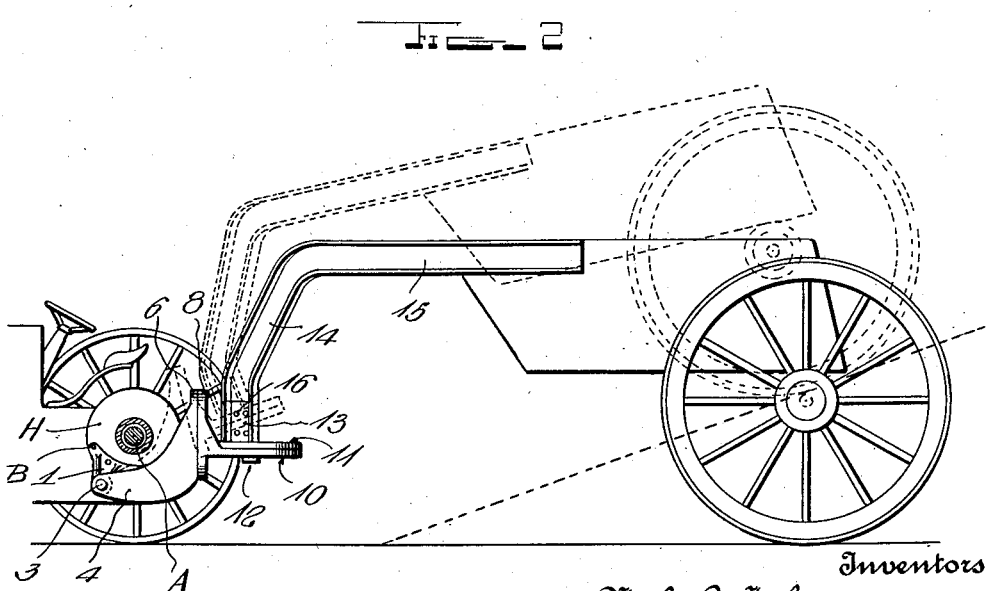
Inventors
Nels O. Johnson,
Edgar C. Anderson,
Witness June 29, 1926.

N. O. JOHNSON ET AL 1,590,582

TRACTOR HITCH

Filed August 6, 1925      3 Sheets-Sheet 2

Inventors
Nels O. Johnson,
Edgar C. Anderson

Witness

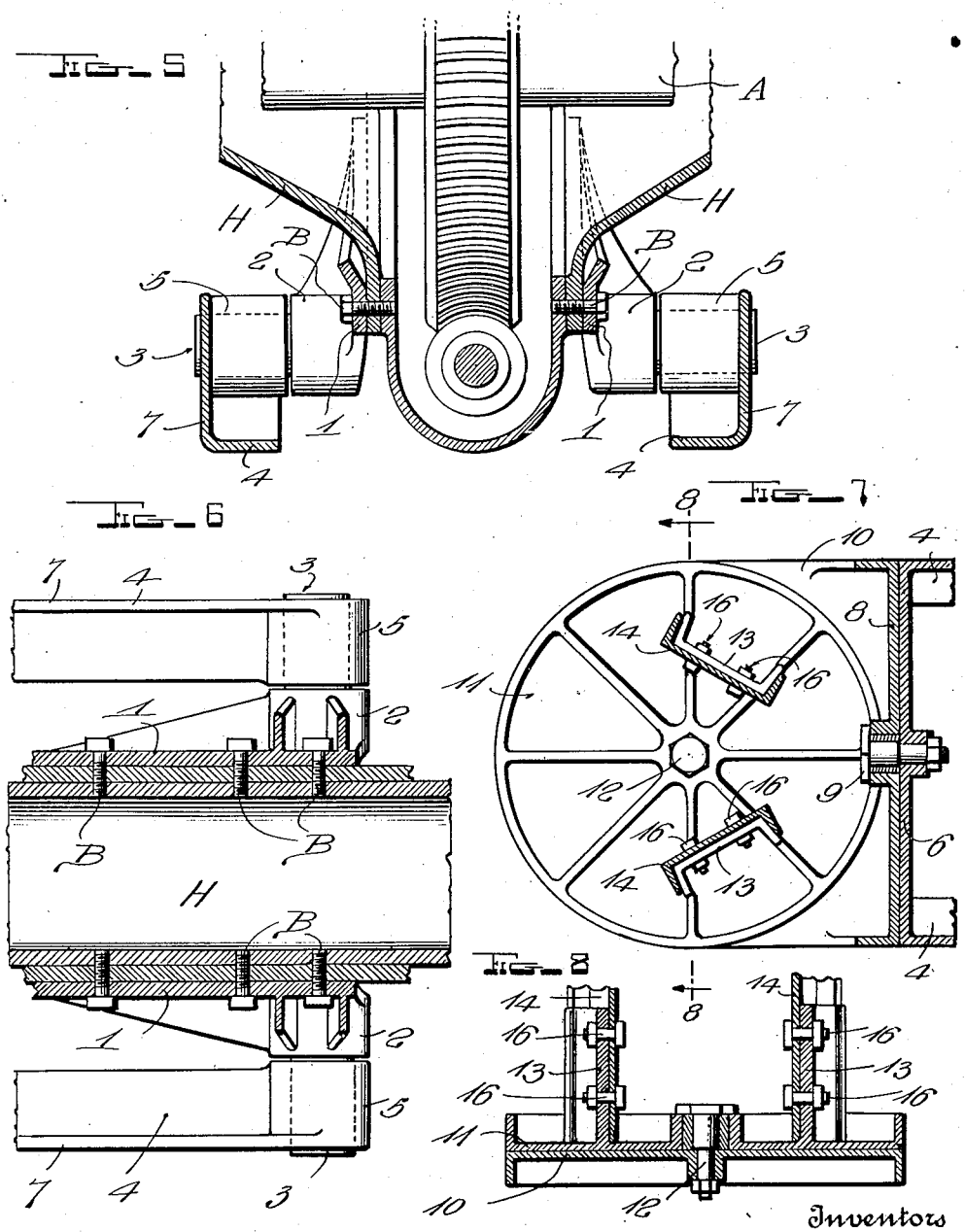

Patented June 29, 1926.

1,590,582

UNITED STATES PATENT OFFICE.

NELS O. JOHNSON AND EDGAR C. ANDERSON, OF KENYON, MINNESOTA.

TRACTOR HITCH.

Application filed August 6, 1925. Serial No. 48,588.

Our invention relates to improvements in hitches for connecting leading vehicles, such as tractors, with trailing loads, for instance, dump carts.

One object of the invention is to provide a new and improved construction of hitch which will place the weight of part of the load upon a tractor with which it is used, at a point in advance of the rear driven axle of said tractor, said point being also below the axle. Thus, not only is effective traction provided for between the driven wheels and the ground or roadway, but the combined weight of the load acting upon the tractor and the rearward pull of such load, serve to effectively hold the front end of the machine down, preventing it from possibly bucking.

A further object of the invention is to provide a hitch in which unique provision is made for permitting all necessary relative movement of the leading machine and trailer or load and minimizing distortion of the hitch through forming unusually wide bearing surfaces between the parts.

Yet another object is to provide a construction which may be quickly and easily attached to a tractor of well known form and may readily be constructed for connection with other forms of tractors or analogous leading machines.

With the foregoing in view, the invention resides in the novel subject matter hereinafter described and claimed, the description being supplemented by the accompanying drawings.

Figure 1 is a top plan view of a portion of a tractor, a dump cart behind the same, and the improved hitch connecting the tractor and cart, and by dotted lines this view illustrates the manner in which angling of the leading and trailing vehicles is permitted when making a turn.

Figure 2 is a side elevation partly in section, showing the parts illustrated in Fig. 1 and disclosing the manner in which relative vertical movements of the leading and trailing vehicles, may take place.

Figure 5 is a vertical transverse section on line 5—5 of Fig. 4.

Figure 6 is substantially a horizontal section on line 6—6 of Fig. 4.

Figure 7 is another horizontal sectional view as indicated by line 7—7 of Fig. 4.

Figure 8 is a vertical transverse sectional view on line 8—8 of Fig. 7.

Figure 3:
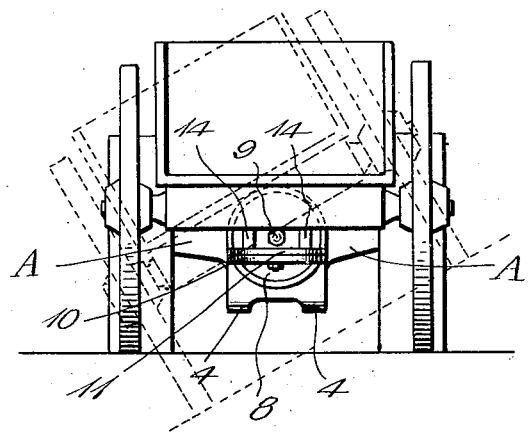
Figure 3 is a rear elevation disclosing the way in which the tractor and the load may relatively turn about a horizontal longitudinal axis.
Figure 4:
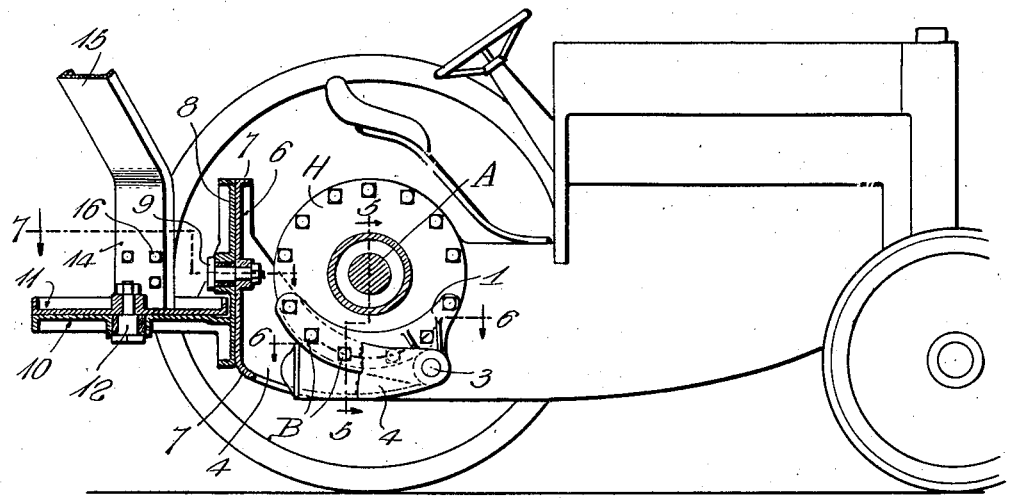
Figure 4 is an enlarged central longitudinal sectional view through the hitch, parts being shown in elevation.

The form of construction herein disclosed will be hereinafter rather specifically described, with the understanding at the outset that within the scope of the invention as claimed, modifications may be made, particularly when the hitch is to be used in connection with machines other than those herein shown.

The numerals 1 designate a pair of elongated arcuate plates which are adapted to be secured against opposite sides of a tractor differential housing H, by a number of the bolts B commonly employed in connection with such housing. The outer sides of the plates 1 are provided with bosses 2 from which axially alined trunnions 3 project, said trunnions being disposed at such points with respect to the plates 1, as to occupy positions in front of the rear tractor axle A, and below said axle. Two longitudinally disposed arms 4 have their front ends provided with bearings 5 which are pivotally mounted upon the trunnions 3, the rear ends of said arms being vertically widened and joined to a vertical plate 6 which is preferably of circular outline. Both the plate 6 and the arms 4 preferably have appropriate reinforcing ribs 7 located at desired points. Contacting with the rear side of the plate 6, is a similar vertical plate 8, these two plates being pivoted together on a horizontal axis 9 which is disposed longitudinally of the tractor or the like. Integral with the plate 8, preferably below the pivot 9, or otherwise rigidly joined to said plate, is a horizontal rearwardly projecting plate 10, and resting upon this plate 10, is a second horizontal plate 11 which is pivoted to said plate 10 on a vertical axis 12. Any desired provision may be made for connecting the trailer or load with the plate 11. In the present showing, this plate is provided with two integral, upstanding projections 13 to which the downwardly turned front ends 14 of longitudinal draft bars 15 are secured by bolts 16 or other desired means.

The pivot 12 permits necessary relative angling of the tractor and the load when rounding corners or making any turns; the pivot 9 permits relative turning of the tractor and load about a longitudinal axis, for instance, when the wheels of one or the other drop into depressions or must pass over obstructions; and the pivots 3 permit any necessary vertical movement of the tractor with respect to the load and vice versa, for instance, when one must travel downgrade and the other upgrade, as when going over the crest of a hill or when traveling across a gully or depression.

Not only are all necessary relative movements between the load and the towing vehicle permitted, but when the invention is used in connection with a tractor, which is our primary intent, part of the weight of the load is carried by the tractor at a point below and in front of the rear driven axle thereof. Thus, not only does the load exert a downward force on the tractor to insure good traction between its rear wheels and the surface over which the machine is being propelled, but this downward force combined with the rearward pull which the load exerts upon the tractor, effectively prevents the latter from bucking, that is, prevents its front end from raising from the ground. Further, through the use of relatively large disk-like contact plates, we provide bearing surfaces which minimize distortion of the hitch, which distortion ordinarily results from twisting and straining of the usual connections.

Excellent results have been obtained from the general construction shown, and it is therefore preferably followed. However, within the scope of the invention as claimed, variations may be made as hereinbefore set forth.

We claim:

1. In a means for connecting a load with a leading vehicle; a vertical plate having a pair of forwardly projecting arms, means for pivoting said arms to the leading vehicle on a horizontal transverse axis, a second plate contacting with the rear side of the first named plate and pivoted thereto on a horizontal longitudinal axis, a third plate projecting rearwardly from the second plate and rigidly joined thereto, and a fourth plate pivotally connected on a vertical axis with said third plate, said fourth plate being adapted for connection with the load.

2. A structure as specified in claim 1; said fourth plate being provided with upstanding projections to which a portion of the load may be secured.

3. A tractor hitch comprising a pair of plates secured to opposite sides of the running gear housing, transversely alined trunnions carried by the plates in advance of and below the rear axle of a tractor, a pair of forwardly projecting arms pivoted at their front ends to the trunnions, a vertical relatively large disk-like plate inter-connecting the rear ends of said arms, a second relatively large disk-like plate contacting with the rear face of the other vertical plate and pivoted thereto on a central longitudinal horizontal axis, a third relatively large disk-like plate extending rearwardly from and rigidly fixed to the second plate below and adjacent its pivot point, a fourth disk-like plate resting upon the third plate and pivoted thereto on a central vertical axis, and a pair of upstanding projections on the fourth plate adapted for connection to a vehicle or the like being drawn.

In testimony whereof we have hereunto affixed our signatures.

NELS O. JOHNSON.
EDGAR C. ANDERSON.